Sept. 17, 1929.  P. H. GEIGER  1,728,537
ELECTRICAL RECTIFIER
Filed Aug. 25, 1927
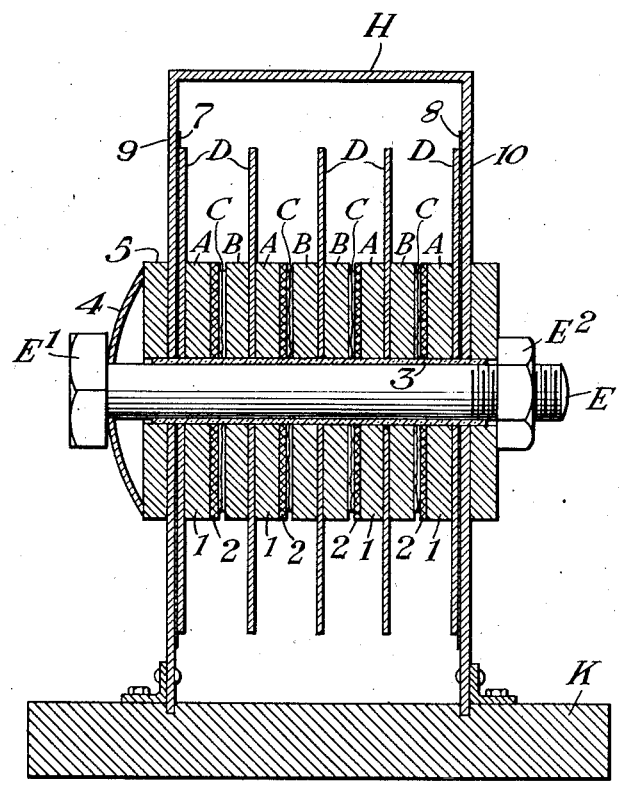
INVENTOR:
P. H. Geiger,
by A. R. Vincill
His Attorney Patented Sept. 17, 1929

1,728,537

UNITED STATES PATENT OFFICE

PAUL H. GEIGER, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL RECTIFIER

Application filed August 25, 1927. Serial No. 215,365.

My invention relates to electrical rectifiers, that is, to devices suitable for changing alternating currents into unidirectional currents.

I will describe one form of electrical rectifier embodying my invention, and will then point out the novel features thereof in claims.

The accompanying drawing is a vertical, longitudinal, sectional view showing one form of electrical rectifier embodying my invention.

Referring to the drawing, the rectifier comprises a plurality of asymmetric units each designated by the reference character A, and each comprising a flat plate 1 of a metal such as copper having a coating 2 of a compound of the metal formed thereon. For example, the coating 2 may be cuprous oxide. Asymmetric units of the type described exhibit the characteristics of offering a higher resistance to current which tends to flow from the copper to the oxide than to current tending to flow in the opposite direction through the unit. A plurality of the asymmetric units A may be assembled on a suitable support, here shown as a bolt E which passes through suitable openings in the units, but which is separated from the units by a sleeve 3 of insulating material. Adjacent the coating 2 of cuprous oxide of each unit A is placed a thin layer C of an impressionable electrical conducting material, such for example, as lead foil. The units A are spaced along the bolt E by conducting spacers B, and interposed at intervals in the stack of units. A and spacers B are fins D each of which is of considerably larger diameter than units A and spacers B. A fin D is also placed at each end of the stack. Each fin D is made of some material which readily conducts heat, such for example, as copper. The asymmetric units may be connected in electrical circuits, not shown in the drawing, by any suitable means. For example, the conductors to the circuits may be attached to proper ones of the fins D.

When rectifiers of the type described are used to change alternating currents into direct currents, the transformation is accompanied by the generation of heat. The heat so generated is radiated by the units themselves and by the spacers B and also by the projecting fins D. It is customary, however, to enclose rectifiers of the type described in a protecting housing to prevent injury to the parts from mechaincal shock, etc. If the rectifier is surrounded by a housing, it will be plain that circulation of air will be impaired, thereby decreasing the amount of heat which can be radiated for a given rise in temperature. This is undesirable because it limits the load which can be placed upon the rectifier for a given rise in temperature.

In order to overcome this objection I enclose the rectifier in a housing H having two parallel walls 9 and 10 spaced apart approximately the same distance as the distance between the two fins D on the outside of the rectifier stack. The bolt E passes through suitable holes in the two walls 9 and 10 and carries two washers 5 and 6 on the outside of the housing and adjacent the walls 9 and 10, respectively. A saucer-shaped washer 4 is interposed between the head $E^1$ of the bolt E and the washer 5, and a nut $E^2$ is threaded on the free end of the bolt. By drawing up on the nut $E^2$ it will be seen that the rectifier elements A, spacers B and the fins D are all clamped rigidly between the walls 9 and 10 of the housing H. In order to insulate the rectifier parts from the housing I interpose a thin sheet 7 of insulating material between the wall 9 and the adjacent fin D, and a similar sheet 8 of insulating material between the wall 10 of the housing H and the adjacent fin D. The sheets 7 and 8 may for example be made of mica. Since the thickness of each of these sheets is small, and the cross section perpendicular to the direction of flow of heat is large, they will conduct a large amount of heat from A and D to the housing wall with only a small difference in temperature between D and 9. With the construction described, it will be plain that all parts of the housing H are in good heat transferring relation with the rectifier elements, and this housing should be made of a material which is a good conductor and radiator of heat. With the rectifier constructed in this manner, the heat generated in the asymmetric units A is conducted to the housing H and is radiated to the surrounding air. Since the area of the housing H which is effective to radiate the heat is considerably larger than the area of the asymmetric units, it follows that a greater amount of heat may be radiated for a given rise in temperature than with the arrangement of apparatus heretofore known. The housing H may be attached to a suitable base K and the joint between the base and housing may be sealed to render the completed rectifier water-proof. Or the housing H may, if desired, be perforated to permit the free circulation of air through the housing and thereby still further increase the amount of heat which can be radiated, while affording a high degree of protection from mechanical injury.

The housing may be used to enclose other pieces of apparatus associated with the rectifier, such for example as a transformer, and when this is so the cooling effect will be improved because the effective radiating surface is increased.

Although I have herein shown and described only one form of electrical rectifier embodying my invention, it is understood that various changes and modifications may be made therein within the scope of the appended claims without departing from the spirit and scope of my invention.

Having thus described my invention, what I claim is:

1. A rectifier comprising a housing of heat conducting and radiating material, a flat asymmetric unit in the housing, a substantially flat heat radiating fin, a sheet of electrical insulating material, and means for clamping the unit, the fin, the sheet and the housing together in the order named.

2. A rectifier comprising a housing of thin sheet metal having two parallel spaced sides, a bolt passing entirely through the two sides but electrically insulated from the housing, a stack of rectifier units carried on said bolt but electrically insulated therefrom, two thin copper fins one on each end of the stack, a sheet of mica interposed between each fin and the adjacent face of the housing, and a nut on said bolt for clamping the stack, the fins and the housing into good heat transferring relation.

In testimony whereof I affix my signature.

PAUL H. GEIGER.